United States Patent
Kajikawa et al.

[11] Patent Number: 6,010,406
[45] Date of Patent: Jan. 4, 2000

[54] OPERATION DEVICE FOR GAME MACHINE

[75] Inventors: Ken Kajikawa, Menlo Park, Calif.; Shinji Hirano; Kazuhito Ooshita, both of Fukushima-ken, Japan

[73] Assignee: Alps Electric Co., Ltd., Japan

[21] Appl. No.: 08/749,369

[22] Filed: Nov. 20, 1996

[51] Int. Cl.[7] .................................................. A63F 9/24
[52] U.S. Cl. .............................................................. 463/37
[58] Field of Search ................................. 463/36, 37, 38, 463/39; 273/148 B; 345/158, 160, 161

[56] References Cited

U.S. PATENT DOCUMENTS

| 5,551,693 | 9/1996 | Goto et al | 463/37 |
| 5,667,220 | 9/1997 | Cheng | 273/148 B |
| 5,700,194 | 12/1997 | Hsien | 463/37 |

FOREIGN PATENT DOCUMENTS 0 695 566 A1  2/1996  European Pat. Off. .
08045392     2/1996  Japan .

*Primary Examiner*—George Manuel
*Attorney, Agent, or Firm*—Brinks Hofer Gilson & Lione

[57] ABSTRACT

A game machine operation device wherein a first grip section and a second grip section have their outer sides curved into the shape of an arc, with the curved surfaces serving as guide sections along which the operator can move his palms. Therefore, the operator is capable of placing his hands or fingers used for operating the device in a comfortable position on the first and second grip sections and freely move his hands or fingers along the curved surfaces. In conventional game machine operation devices, the grip sections are formed so as to extend vertically downward, which prevents the operator from changing the position of his hands, depending on his hand size, so that an operator with large hands cannot operate the operation device easily, causing him to get tired hands or fingers.

14 Claims, 5 Drawing Sheets

OPERATION DEVICE FOR GAME MACHINE

BACKGROUND OF THE INVENTION

1. Field of the Invention

The present invention relates to an operation device for use in a game machine in order to execute, for example, a television game of a television game machine, a computer game of a computer with a display, or the like.

2. Description of the Related Art

Figure 8:
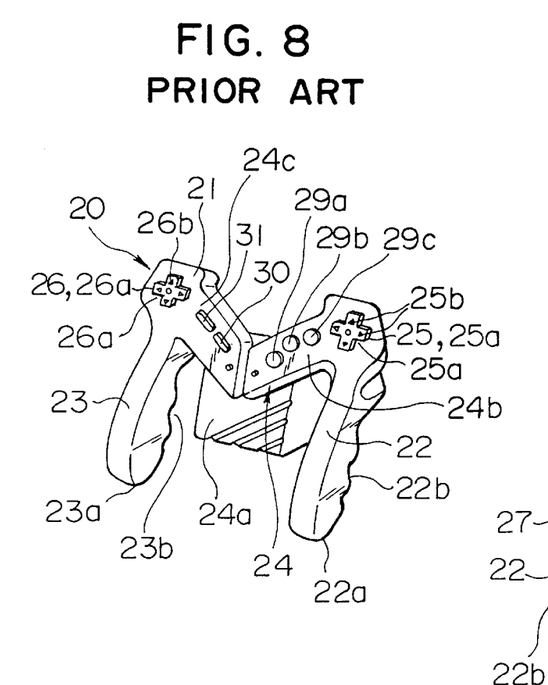
FIG. 8 is a front perspective view of a conventional operation device for a game machine.
Figure 9:
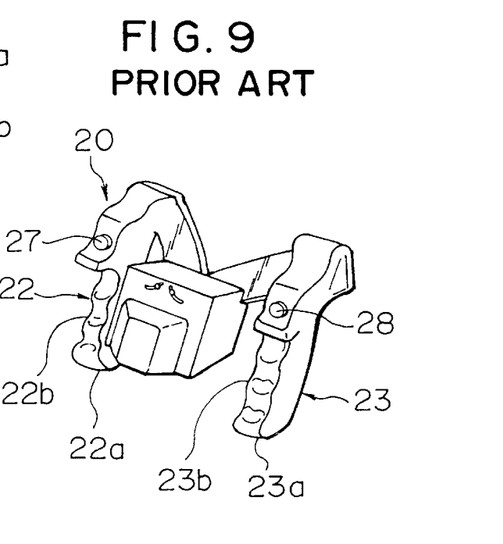
FIG. 9 is a back perspective view of the conventional operation device for a game machine.
Figure 10:
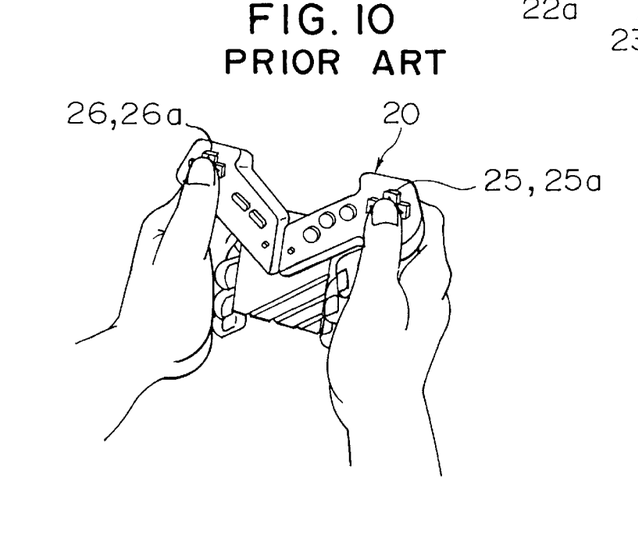
FIG. 10 is a view of the conventional operation device for a game machine, when it is being operated.

A conventional operation device for a game machine is disclosed, for example, in Japanese Unexamined Patent Publication No. 8-45392. FIGS. 8 and 9 illustrate the external appearance thereof, while FIG. 10 illustrates the operation device being operated.

FIG. 8 shows the housing 21 forming the external shape of an operation device 20 for a game machine (hereinafter simply referred to as "operation device"). In the housing 21, a right grip section 22, a left grip section 23, and a connecting section 24 which connects the left and right grip sections 22 and 23 are made of resinous material or the like. A properly shaped substrate (not shown) is accommodated in the housing 21, and has formed thereon a required conduction circuit pattern by printing or the like.

In the operation device 20, the left and right grip sections 22 and 23 extend vertically downward from the connecting section 24 and are placed in the palms of the operator. The ends 22a and 23a thereof are formed so as not extend beyond the hands of the operator. Therefore, as shown in FIG. 10, the operator grips the grip sections 22 and 23, with his palms positioned substantially vertically on the operation device and on either side of the connecting section 24. The grip sections 22 and 23 have depressions and protrusions 22b and 23b formed in correspondence with where the middle fingers, the third fingers, and the little fingers are placed on the left and right grip sections 22 and 23, so that he can comfortably place these fingers on the left and right grip sections 22 and 23. When the operator grips the left and right grip sections 22 and 23, the left and right grip sections 22 and 23 are hidden by the palms of the operator. When the left and right grip sections are being molded, the depressions and protrusions 22b and 23b thereof are formed integrally with the left and right grip sections 22 and 23.

A first direction indicator switch 25 and a second direction indicator switch 26 are provided toward the front on the left and right grip sections 22 and 23 and where the left and right thumbs of the operator are placed. When operated, a character, such as the main character, of the game is moved in a certain direction.

The first direction indicator switch 25 comprises a cross-shaped key top 25a provided with four pressing sections 25b which correspond to the four directions in which a character can be moved in orthogonal directions, such as forward or backward, or left or right. The four pressing sections 25b are disposed either parallel to or at right angles to the central axis of the operation device 20.

Similarly, the second direction indicator switch 26 comprises a cross-shaped key top 26a provided with pressing sections 26b which correspond to the four directions in which a character can moved, such as up or down, or diagonally left or right.

As shown in FIG. 10, the thumbs of the operator are placed on the key tops 25a and 26a of the first direction indicator switch 25 and the second direction indicator switch 26, respectively. When the operator presses any one of the four protruding portions of the cross-shaped key top 25a or 26b, the character moves in the direction based on the protruding portion pressed.

As shown in FIG. 9, operational indicator switches 27 and 28 whose key tops are formed spherically are disposed at the back side and forwardly of the left and right grip sections 22 and 23, that is at the portions of the back sides of the two direction indicator switches 25 and 26 where the left and right index fingers of the operator are placed when he grips the left and right grip sections 22 and 23. These operational indicator switches 27 and 28 are pressed to cause the character to, for example, run or fly, depending on the content of the game program.

The connecting section 24 comprises a power supply accommodating section 24a at the center thereof, a right connecting section 24b for connecting the right grip section 22, and a left connecting section 24c for connecting the left grip section 23. The power supply accommodating section 24a accommodates a dry cell, a battery, or the like.

The right connecting section 24b is provided with three operational indicator switches 29a, 29b, and 29c, with the key top of each switch being formed into a spherical shape and into a size that can be covered by the thumb of the operator. These three operational indicator switches are disposed close to each other and at a location that can be reached by the right thumb of the operator. In addition, when these operational indicator switches are operated, it is possible to perform operations which are different from those performed when the aforementioned operational indicator switches 27 and 28 are operated. For example, they can cause the character to trigger a gun, to fire a missile, or to punch.

A start switch 30 and a select switch 31 are provided in the left connecting section 24c, with both of the switches being elongated in shape. The start switch 30 is used to start a game, while the select switch 31 is used to select the type of game and content thereof. These switches 30 and 31 are disposed at a location that can be reached by the left thumb of the operator.

In the above-described operator device 20, however, the grip sections 22 and 23 are made small to the extent that when the operator grips the left and right grip sections 22 and 23, his palms hide the grip sections 22 and 23. In addition, the grip sections 22 and 23 are formed so as to extend vertically downward. Therefore, although operators have different hand sizes, they must grip the same parts of the grip sections, thereby making the operator device 20 difficult to operate and causing the operator to get tired hands.

The operator, gripping the device 20, can operate the operation device 20 by placing his hands on a table or the like. However, the grip sections 22 and 23 are placed in the palms of the operator, so that even if he can place his hands on the table, he is forced to operate the operation device 20 above the table. This means that his hands rub against the table, which results in sore hands, when the operator operates the operation device 20 for a long time with his hands on the table.

When the left and right grip sections 22 and 23 are provided with depressions and protrusions 22b and 23b, the operator can place his middle fingers, small fingers, and index fingers in the depressions 22 and 23, which ensures a firmer grip on the grip sections 22 and 23. However, an operator with hands larger than average size will not be able to fit his three fingers into the depressions 22b and 22b, so that his little fingers will be placed outside the depressions, resulting in an unstable grip and preventing quick operation of the operation device 20. On the other hand, an operator with hands smaller than average size will not be able to fit his fingers properly into the depressions 22b and 23b because they are not of the proper size for him, resulting in an unstable grip on the grip sections 22 and 23.

The depressions and protrusions 22b and 23b of the left and right grip sections 22 and 23, respectively, are made of resinous material or the like and formed integrally with the left and right grip sections 22 and 23, so that when the operator becomes absorbed in the game and gets sweaty fingers, his fingers slide out from the depressions, making it difficult for the operator to operate the operation device 20.

In addition, in the conventional operation device 20, the key tops 25a and 26a of the first and second direction indicator switches 25 and 26, respectively, are both cross-shaped. Therefore, when the operator has his thumbs on the key tops 25a and 26a, the left and right key tops 25a and 25b feel exactly the same to the touch, making it difficult for the operator to distinguish between the left and right switches 25 and 26. Consequently, it will be difficult for an inexperienced operator to immediately distinguish between the left and right switches, thus preventing him from operating the operation device 20 quickly. Further, the pressing sections 25b and 26b of the key tops 25a and 26a are disposed parallel to and at right angles to the central axis of the operation device 20, which forces the operator to constantly position his thumbs parallel to the central axis of the operation device 20. Consequently, the operator with large hands cannot operate the operation device 20 easily, and will thus get tired hands easily.

In order to make the operation device 20 small, the key tops of the operation switches 29a, 29b, and 29c, the start switch 30, and the select switch 31, all of which are disposed on the connecting section 24, are made small. In addition, the separation distances between the key tops are small. Therefore, the operator is forced to operate the switches by placing his thumb on any one of the circular or elongated key tops and vertically moving his thumb so as not to press the switch next to the one the operator intends to press. Therefore, proper switching operations cannot be carried out, resulting in poor operability of the operation device 20.

SUMMARY OF THE INVENTION

To overcome the above-described problems, according to a first form of the present invention, there is provided an operation device for use in a game machine, the device comprising a housing comprising (i) a first grip section and a second grip section, both of which are gripped by an operator with both hands, and (ii) a connecting section for connecting the first grip section and the second grip section.

According to a second form of the invention, there is provided an operation device for use in a game machine, wherein the first grip section and the second grip section are conically shaped with a curve of large radius, and are disposed so as to form an inverted V shape.

According to a third form of the invention, there is provided an operation device for use in a game machine, wherein the connecting section and the first grip section and the second grip section form a continuous curved surface.

According to a fourth form of the invention, there is provided an operation device for use in a game machine, wherein the connecting section has formed at its back side recesses whose curved surface are formed continuously with the curved surfaces of the first grip section and the second grip section, with at least the middle fingers positioned in the recesses when the operator is gripping the first and second grip sections with his palms and fingers.

According to a fifth form of the invention, there is provided an operation device for use in a game machine, wherein the first grip section and the second grip section are formed long enough such that an end of the first grip section and an end of the second grip section extend beyond the palms of the operator, which allows the operator to operate the operation device with the ends of the first and second grip sections on a table.

According to a sixth form of the invention, there is provided an operation device for use in a game machine, wherein the first grip section and the second grip section are each provided with an anti-slippage member, each being formed at a location on the first grip section and at a location on the second section where, at least, the third and little fingers are placed.

According to a seventh form of the invention, there is provided an operation device for use in a game machine, the device comprising: a housing comprising a first grip section and a second grip section, both of which are gripped by an operator, and a connecting section for connecting the first and second grip sections; a first operation means disposed at a location within reach of one of the thumbs on the connecting section while the operator is gripping the first grip section; and a second operation means disposed at a location within reach of the other thumb on the connecting section while the operator is gripping the second grip section; wherein the first operation means comprises a plurality of key tops, while the second operation means comprises one key top with pressing sections.

According to an eighth form of the invention, there is provided an operation device for use in a machine game, wherein the key tops of the first operation means are flame-shaped, one side of each being semi-circular and the other side of each being tapered, the semi-circular side disposed where the finger tip of the operator is placed and the tapered side disposed where the base of the finger of the operator is placed while the operator is gripping the first grip section.

According to a ninth form of the invention, there is provided an operation device for use in a game machine, wherein the separation distance between the key tops of the first operation means is smaller than the width of the thumb of the operator, and the outer side surfaces of the key tops are curved, allowing the operator to press any one of the key tops by a rotational movement of the thumb.

According to a tenth form of the invention, there is provided an operation device for use in a game machine, further comprising a third operation means disposed at a location within reach of the left and right index fingers or the left and right middle fingers on the connecting section, the third operation means comprising a plurality of flame-shaped key tops, one side of each being semicircular and the other side of each being tapered, each semicircular side being disposed where the tip of the index finger or the tip of the middle finger is placed while the operator is gripping the grip section, and each tapered side being disposed where the base of the index finger or the base of the middle finger is placed while the operator is gripping the grip section, the key tops forming two columns, a column containing two key tops, disposed symmetrically on the left and right sides of the front side surface of the connecting section.

According to an eleventh form of the invention, there is provided an operation device for use in a game machine, wherein in the first operation means the distance between the key top closest to the front side surface of the connecting section and a central line of the housing is less than the distance between the key top furthest from the front side surface and the central line of the housing, and wherein in the second operation means the distance between the pressing section of the key top closest to the front side surface of the connecting section and the center line of the housing is less than the distance between the pressing section of the key top furthest from the front side surface and the central line of the housing.

According to a twelfth form of the invention, there is provided an operation device for use in a game machine, wherein in the first operation means when the key top closest to the front side surface of the connecting section is connected to the key top furthest from the front side surface with a line, the other two key tops are formed on a line perpendicular to the line, whereby the four key tops are disposed at the corners of a square, and wherein in the second operation means when the key top pressing section closest to the front side surface of the connecting section is connected to the key top pressing section furthest from the front side surface with a line, the other two key top pressing sections are formed on a line perpendicular to the line, whereby the four key top pressing sections are disposed at the corners of a square.

DESCRIPTION OF PREFERRED EMBODIMENTS

A description will now be given of the preferred embodiments of the operation device for use in a game machine in accordance with the present invention, with reference to FIGS. 1 to 7. Referring to the figures, in an external front view of the operation device 1 for use in a game machine of the present invention (hereinafter simply referred to as "operation device"), the housing 2 is formed into an inverted V-shape and in the shape of a boomerang. The housing 2 is formed by molding resinous material or the like such that the surfaces thereof are curved into the shape of an arc, and can be vertically separated at a boundary defined by a connecting line 2a, as shown in FIG. 4 which is an external side view of the housing 2.

Figure 1:
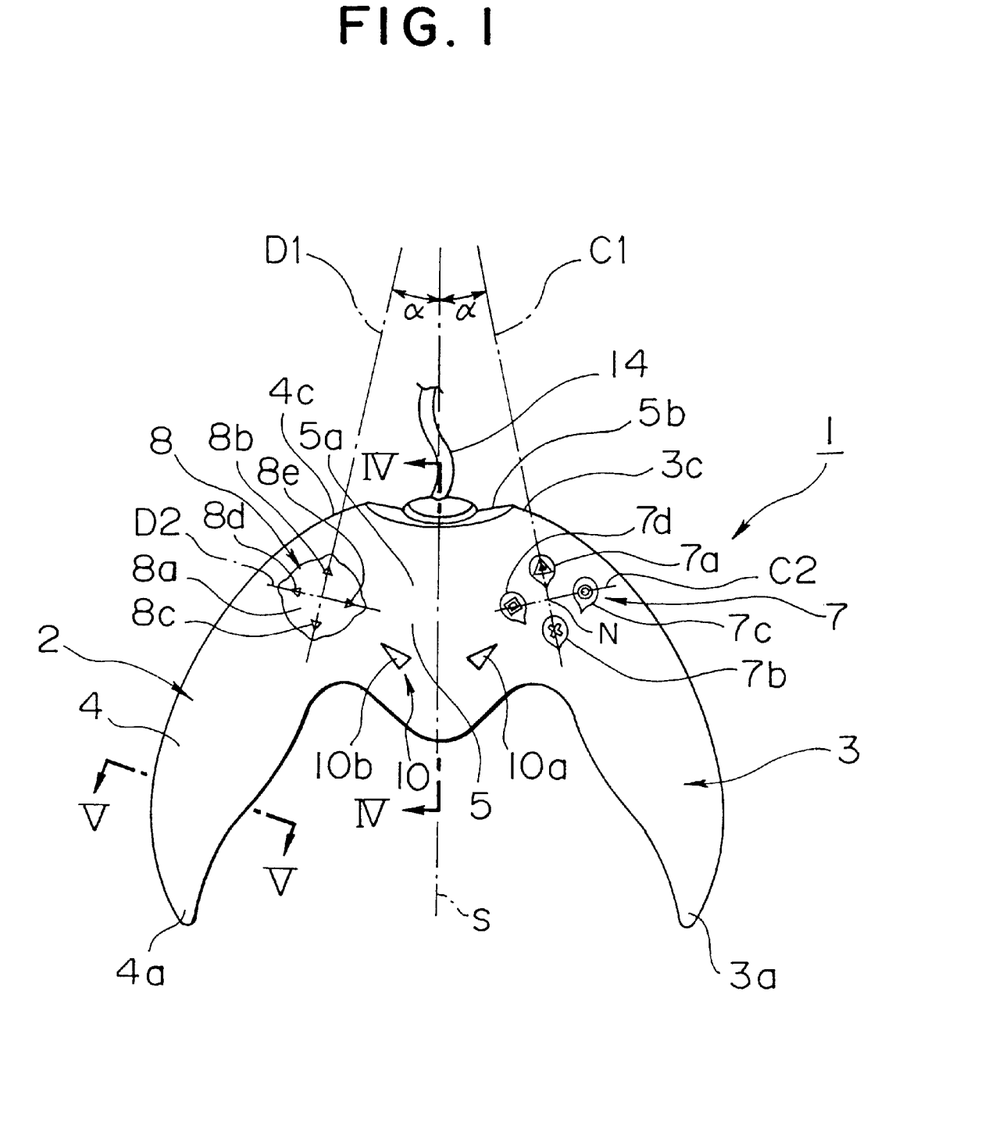
FIG. 1 is a front view of an operation device for a game machine in accordance with the present invention.
Figure 2:
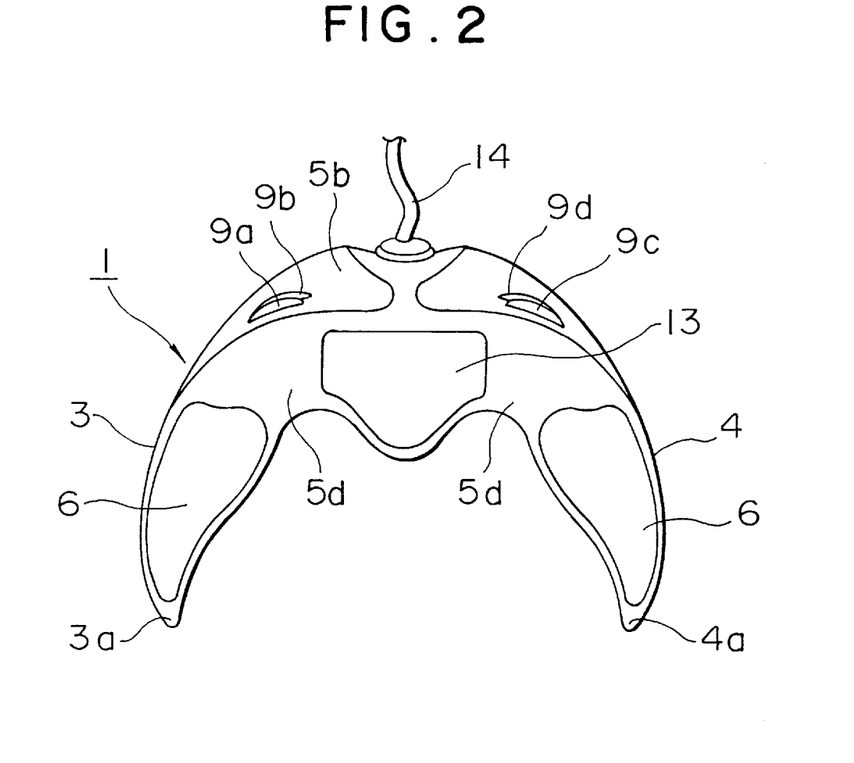
FIG. 2 is a back view of the operation device for a game machine in accordance with the present invention.

A first grip section 3 and a second grip section 4 which are gripped by the operator are formed symmetrically on the left and right sides of a central line S of the housing 2, with a connecting section 5 formed for connecting the first grip section 3 and the second grip section 4. The inside of the housing 2 is hollow and contains a substrate (not shown) which is of the proper size and has formed thereon a required electrical circuit as a result of printing or the like.

The portion where the first grip section 3 and the second grip section 4 are connected by the connecting section 5 has a large outside diameter which gradually decreases toward an end 3a of the grip section 3 and an end 4a of the grip section 4. The shape of the sections 3 and 4 becomes substantially conical towards these ends 3a and 4a, so that they are formed into a thickness which allows the operator to grip the grip sections 3 and 4 with his palms and at least with his middle and small fingers. The overall appearance of the device is curve-shaped with a large radius, with the first and second grip sections 1 and 2 having an inverted V-shape and being formed into hollow cylinders. Accordingly, the first and second grip sections 3 and 4 are shaped such that the operator can move his hands along upper curved surfaces 3c and 4c of the first and second grip sections 3 and 4, respectively, depending on his hand size, so that the operability of the operation device does not depend on the hand size of the operator.

Figure 6:
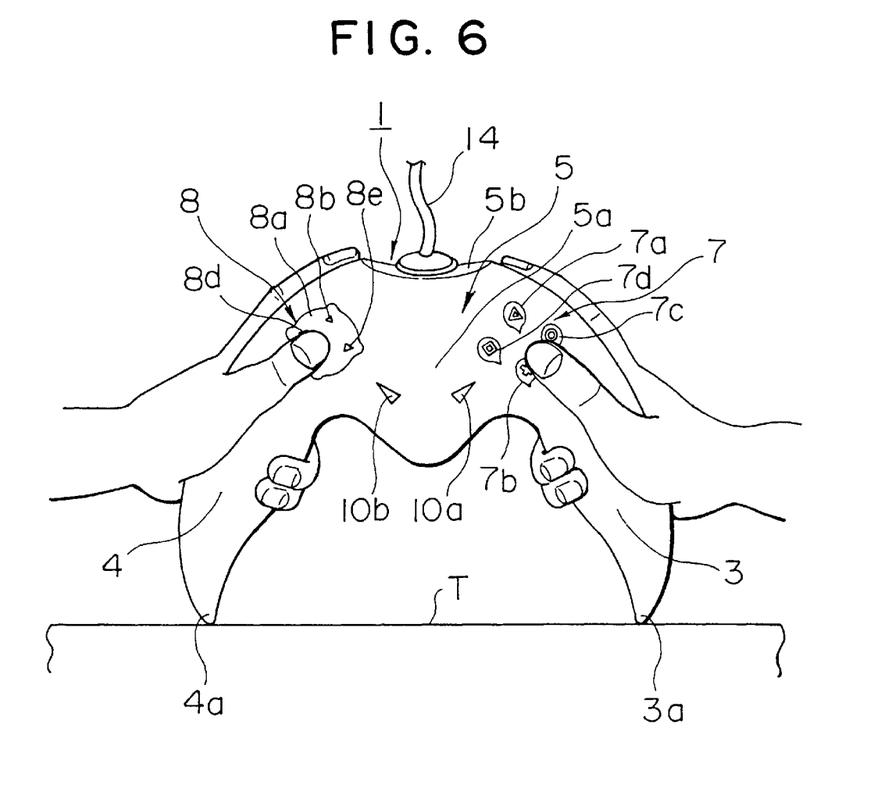
FIG. 6 is a front view of the operation device for a game machine, when it is being operated.

As shown in FIG. 6, the grip sections 3 and 4 which are gripped using the palms and the third and little fingers are formed long enough such that the ends 3a and 4a extend sufficiently beyond the palms of the operator, while the operator is gripping the grip sections 3 and 4. Therefore, it is possible for the operator to operate the operation device with the ends 3a and 4a of the grip sections 3 and 4 placed on the table T or the like.

As shown in the front view of FIG. 1, the ends 3a and 4a of the grip sections 3 and 4 are shaped such that their width decreases toward the tips thereof and their sides form acute angles. As shown in FIG. 4 which is a cross section taken along line A—A of FIG. 1, the operation device 1 appears egg-like in appearance as viewed from a side and is internally hollow.

Rubbers 6 are integrally formed by bonding or molding on the portions of the first and second grip sections 3 and 4 where the third and little fingers of the operator are positioned when he grips the grip sections 3 and 4. The rubbers are soft materials, such as urethane rubber, which serve as anti-slipping members.

As shown in FIG. 1, the first operation means 7 is disposed within a location on the surface 5a of the connecting section 5 which can be reached by the right thumb of the operator who is gripping the first grip section 3 with his right hand. The first operating means 7 comprises four key tops 7a to 7d. The corresponding switches (not shown) thereof are connected to an electrical circuit formed in the housing 2.

The key tops 7a to 7d are formed into the shape of a vertically-elongated flame in which one side of each key top is semi-circular and the other side of each key top is tapered. The overall shape of the key tops is close to being a semicircle. The flame-shaped key tops are arranged such that the semicircular side of each key top is disposed where the tip of the thumb of the operator who is gripping the grip section 3 is positioned and the tapered side of each key top is disposed where the base of the thumb of the operator is positioned.

The distance between the key tops 7a and 7b, and the distance between the key tops 7c and 7d are smaller than the width of the thumb, so that when the operator places his right thumb at a center point N defined by the key tops 7a to 7d, he can operate the first operation means 7 by simply, slightly, and rotationally moving his right thumb up or down, or to the right or left. Thus, the operator can press both the key tops 7b and 7d at the same time. Similarly, the operator can press both the key tops 7c and 7b, the key tops 7a and 7d, or the key tops 7a and 7c at the same time.

In the first operation means 7, the distance between the key top 7a (the key top closest to a front side face 5b of the connecting section 5) and the center line S of the housing 2 is smaller than the distance between the key top 7b (furthest from the front side face 5b) and the center line S of the housing 2. Line C1 connecting the two key tops 7a and 7b is inclined by a predetermined angle α of, for example, about 12° with respect to the center line S of the housing 2. The angle α is set such that the operator can grip the first and second grip sections 3 and 4 with his thumbs positioned at a comfortable angle.

The other two key tops 7c and 7d are disposed on a line C2 which intersects at right angles to the line C1 connecting the two key tops 7a and 7b, so that the key tops 7a to 7d are disposed at the corners of a square. In other words, two key tops are disposed on line C1, while the other two key tops are disposed on line C2, all of which are at equal distances from an intersection point of the two lines C1 and C2.

A second operation means 8 is disposed within a location on the surface 5a of the connecting section 5 which can be reached by the left thumb of the operator who is gripping the second grip section 4 with his left hand.

The second operation means 8 comprises a key top 8a composed of a multi-directional input switch. The key top 8a is substantially square-shaped with its four corners rounded and is wider than the width of the thumb of the operator. In addition, pressing sections 8b to 8e are provided at the four corners of the key top 8a.

In the second operation means 8, the distance between the pressing section 8b (closest to the front side face 5b) of the key top 8a and the center line S of the housing 2 is smaller than the distance between the pressing section 8c (furthest from the front side face 5b) of the key top 8a and the center line S of the housing 2. Line D1 connecting the two pressing sections 8b and 8c of the key top 8a is tilted at a predetermined angle α of, for example, about 12° with respect to the center line S of the housing 2.

The other two pressing sections or direction indicator switches 8d and 8e are disposed on a line D2 which intersects at right angles line to D1 connecting the pressing sections 8b and 8c of the key top 8a, with the separation distance thereof being the same as the separation distance between the pressing sections 8b and 8c.

A plurality of switches are provided in the housing 2 in correspondence with the key top 8a and are connected to an electrical circuit (not shown) in the housing 2.

Figure 3:
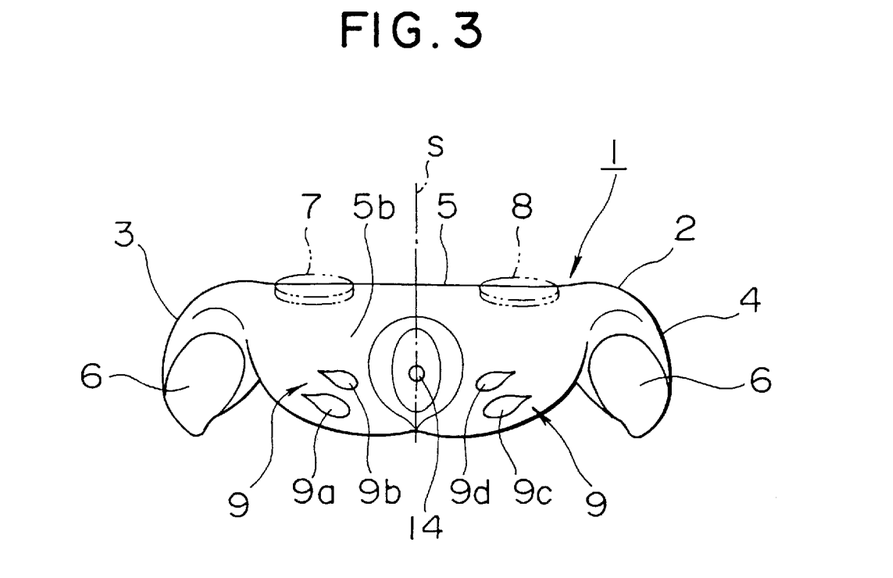
FIG. 3 is a front elevation view of the operation device for a game machine in accordance with the present invention.
Figure 4:
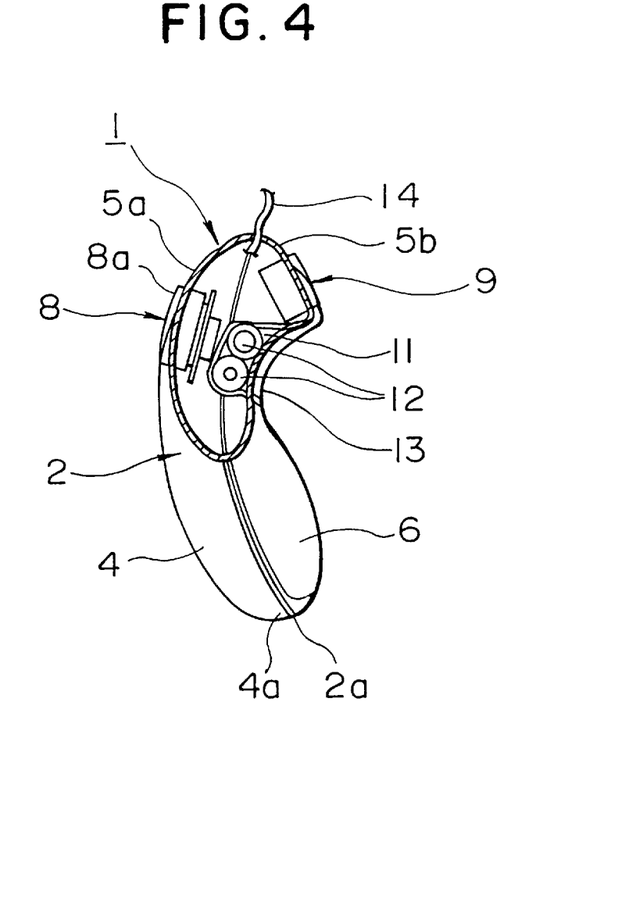
FIG. 4 is a cross sectional view taken along line 4—4 of FIG. 1.
Figure 5:
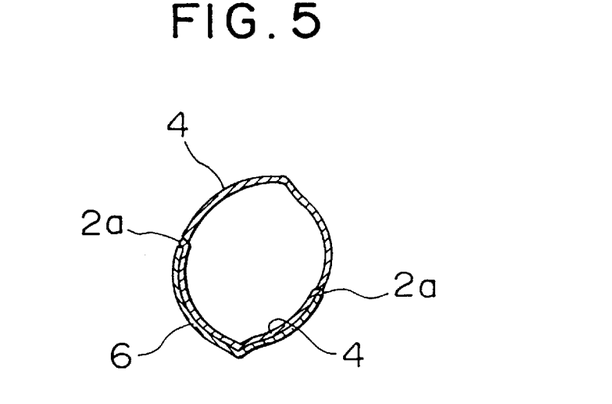
FIG. 5 is a cross sectional view taken along line 5—5 of FIG. 1.

As shown in FIG. 3, a third operation means 9 is disposed within a location on the front side face 5b of the connecting section 5 which can be reached by the left and right index fingers of the operator who is gripping the first and second grip sections 3 and 4. The third operation means 9 comprises four key tops 9a to 9d which are disposed in two columns, a column including two key tops, arranged symmetrically on the left and right sides of the line S, with two key tops disposed above the other two key tops.

These key tops 9a to 9d are shaped into a vertically-elongated flame such that one side of each is semicircular and the other side is tapered, as has been the case for the key tops 7a to 7d of the first operation means 7.

In the third operation means, the upper key tops 9b and 9d are operated by the index finger, while the lower key tops 9a and 9c are operated by the middle finger. The key tops 9a to 9d are disposed such that the semicircular side of each is positioned toward the tip of the index finger or the middle finger, and the tapered side of each is positioned toward the base of the index finger or the middle finger.

Figure 7:
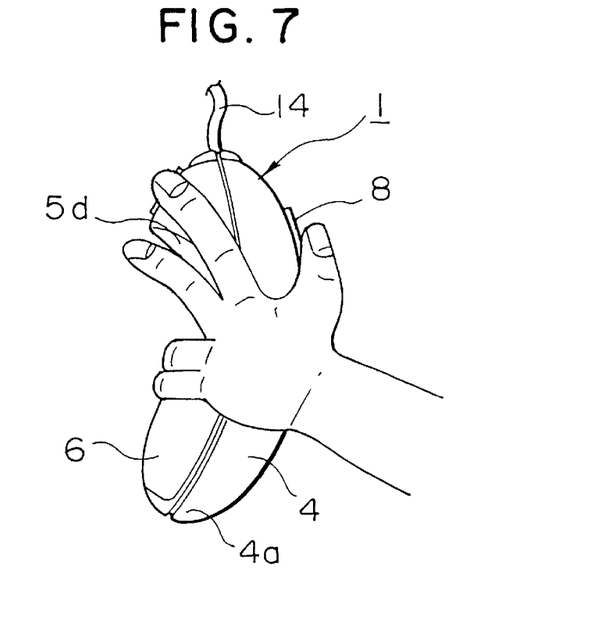
FIG. 7 is a left side view of the operation device for a game machine, when it is being operated.

Since the third operation means is used less frequently than the first and second operation means 7 and 8, the middle fingers which operate the lower key tops 9a and 9c are positioned in recesses 5d at the back side of the connecting section 5 in order to stabilize the overall grip on the operation device 1, as shown in FIGS. 6 and 7. The recesses 5d are gently curved, so that the operator can easily move his middle finger, and comfortably fit the operation device in his hands.

A fourth operation means 10 is disposed symmetrically on the left and right sides of the center line S of the housing 2. Both of them are disposed toward the center of the surface 5a of the connecting section 5 between the first and second operation means 7 and 8, in front of the operator, and at a location of the surface 5a of the connecting section 5 which can be reached by both thumbs of the operator who is gripping the first and second grip sections 3 and 4. Both of the fourth operation means 10 comprise a start switch 10a being a push button switch, and a select switch 10b. In the fourth operation means, the start switch 10a is disposed, for example, on the right side, and operated to start or finish a game, while the select switch 10b is disposed on the left side, and operated to select a game program. The key tops of the switches 10a and 10b are shaped almost like an equilateral triangle, with the apex of one of the switches facing the first operation means 7 and the apex of the other switch facing the second operation means 8. Therefore, the switches 10a and 10b are disposed along the paths of rotational movement of the thumbs of the operator.

A cord 14 is disposed forwardly of the operation device 1 and is led externally from the front face 2a of the housing 2 in order to transmit an operation signal, generated by pressing any one of the first to fourth operation means 7 to 10, to a game machine (not shown).

When an operation signal is to be transmitted without the use of cord 14 or the use of wires, as shown in FIG. 4 which is a cross section taken along line A—A of FIG. 1, a battery accommodating section 11 is provided in the connecting section 5 in order to accommodate a power supply, such as a battery 12, therein. A battery cover 13 is provided to cover the battery accommodating section 11 so as not to hinder the operation of the operator, as shown in the back view of FIG. 2.

The cord 14, disposed toward the front of the operation device 1, is led externally from the front face 2a of the housing 2 in order to transmit an operation signal, generated by operation of any one of the first to fourth operation means 7 to 10, to a game machine (not shown).

A description will now be given of the operation of the operation device in accordance with the present invention. The operator grips the first grip section 3 with his right hand. Here, the operator can move his right hand along the upper curved surface 3c, depending on his hand size, and set his fingers comfortably on the grip section 3 such that his thumb can easily reach the four key tops 7a to 7d of the first operation means 7. When the operator grips the grip section 3, the right index finger and the right middle finger of the operator are placed on the front side face 5a of the connecting section 5 such that the index finger and the middle finger can easily reach the two key tops 9a and 9b, respectively, of the third operation means 9.

The operator then grips the second grip section 4 with his left hand. Here again, as when the operator is gripping the first grip section 3 with his right hand, the operator can move his left hand along the upper curved surface 4c and position his fingers comfortably on the second grip section 4 such that his thumb can easily reach any one of the pressing sections 8b to 8e of the key tops 8a (comprising a multi-directional input switch) of the second operation means 8. The left index finger and the left middle finger of the operator are placed on the front side of the surface 5a of the connecting section 5 such that the index finger and the middle finger can easily reach the two key tops 9c and 9d, respectively, of the third operation means 9. Here, the ends 3a and 4a of the first and grip sections 3 and 4 extend sufficiently beyond the palms of the operator. The left and right middle fingers of the operator are positioned at the recesses 5d such that they can move and press the lower key tops 9a and 9c, respectively, of the third operation means any time. It is to be noted that it does not matter which grip section is gripped first.

Accordingly, when the operator grips the operation device 1 with his hands, the grip sections 3 and 4 are comfortably placed in his palm and his fingers, and the curved form of the first and second grip sections 3 and 4, the connecting section 5, and the recess 5d allow the operation device 1 to fit comfortably into the hands of the operator.

The operator, gripping the grip sections 3 and 4, operates the operation device 1 in the air. For more stable operation of the operation device 1, the operator can place the ends 3a and 4a of the first and second grip sections 3 and 4 extending beyond the hands of the operator on a table T or the like.

While gripping the first grip section 3, the operator presses the right pushbutton switch of the fourth operation means 10, that is the start switch 10a, with his right thumb, in order to start a game program (not shown).

Then, while pressing the start switch 10a, the operator slides his right thumb toward the right and places in onto the first operation means 7 which can be pressed any time.

Then, the operator, gripping the second grip section 4 with his left hand, presses the left pushbutton switch, that is the select switch 10b, of the fourth operation means 10 with his left thumb, whereby a desired game program is selected from a plurality of game programs, followed by starting up of the selected game program on the screen of the game machine (not shown). Thereafter, while pressing the select switch 10b, the operator slides his left thumb toward the left and onto the second operation means 8 which can be pressed any time by the operator.

When the game program is started on the screen of a game machine, the operator places either his left or right thumb on the first or second operation means, in this case his left thumb at the center of the key top 8a (of the second operation means) comprising a multi-directional input switch, and slides his left thumb on the key top 8a toward the left or right such that his thumb describes an arc, whereby the left pressing section 8d or right pressing section 8e is pressed. When the operator, moving his thumb upwards, slides his thumb smoothly forward and backward and presses the front pressing section 8b or the back pressing section 8c, a circuit of the switch section (not shown) is turned on. Therefore, depending on the content of the game program, the character (for example, the main character) of the game can be moved in any one of the four directions, front, back, left, or right.

On the other hand, selecting and pressing any one of the flame-shaped key tops 7a to 7d of the first operation means 7 causes, depending on the content of the game program, the character to, for example, punch, kick, jump, squat down, or take other movements other than those movements (vertical movements and tilting toward the left or right) commanded by the first operation means 7.

The operator pressing the key top 7a can slide his right thumb from the semicircular side of the flame-shaped key top to the tapered side thereof, that is move it upward and smoothly along the key top to another key top 7b or the like. In addition, from the center point N defined by the key tops 7a to 7d of the first operation means 7, the operator can press any one of the key tops 7a to 7d by rotationally sliding his thumb. The operator can press, for example, the key tops 7b and 7d at the same time in order to cause the character to take complicated movements including oblique rotation.

The first operation means 7 or the second operation means 8 can be pressed in order to freely move the character of the game in any of the eight directions, or the first operation means 8 and the second operation means 8 can be pressed in combination in order to cause the character to move three dimensionally.

While operating the first and second operation means 7 and 8 with his left and right thumbs, the operator presses any one of the flame-shaped key tops 9a to 9d, using his left or right index finger, or his left or right middle finger, which are positioned on the third operation means 9. Depending on the content of the game program, operation of the third operation means causes the character to take four kinds of movements such as "triggering a gun", "firing a missile", or the like.

Operation of the third operation means 9, the first operation means 7, and the second operation means 8 in combination, using the left and right thumbs, the left and right middle fingers, and the left and right index fingers, causes the character to take, for example, various combat actions, when the game is a combat game. When the character is a fighting plane, and the fighting plane is flying to the right as a result of the operation of the first operation means 7, the third operation means 9 can be operated to cause firing of a missile, or the second operation means 8 can be operated to cause firing of the missile downward and toward the right.

As can be understood from the foregoing description, according to the operation device 1 for use in a game machine, the outer sides, curved into an arc shape, of the first and second grip sections serve as guide sections along which the operator can move his palms. The first and second grip sections are conically formed with a large radius, and are disposed so as to form an inverted V shape. The curved faces of the first and second grip sections are continuously formed. Therefore, the first and second grip sections are formed such that the operator can freely move his hand or fingers along the arc-shaped surfaces thereof, depending on the hand size of the operator, in order to change the gripping positions of his hand or fingers to a position allowing comfortable and easy operation of the operation device 1, thus making it possible for anyone, from a child to an adult, to operate the operation device 1.

In addition, the first and second grip sections are provided with recesses formed at the back side of the connecting section, such that their curved surface are formed continuously with the surfaces of the first and second grip sections, respectively. Therefore, when the operator grips the first and second grip sections using his palms and fingers, at least his middle fingers are positioned in the recesses, thereby increasing the number of locations that can be supported by the operator and thus stabilizing the grip on the entire operation device, as a result of which the operation device fits comfortably in the hands of the operator. In addition, the recess has a curved surface, which allows the operator to move his middle finger smoothly.

Further, the first and second grip section are formed long enough to extend beyond the palms of the operator, thus making it possible for the operator to operate the operation device by placing the ends of the first and second grip sections on a table or the like, in addition to allowing him to operate the operation device in the air. Consequently, the operator will seldom get tired hands, even after long periods of operation.

Anti-slippage members are provided where, at least, the third fingers and the little fingers are positioned, when the operator grips the first and second grip sections, so that even when the operator gets absorbed in the game and gets sweaty hands, the rubbers forming the anti-slippage members prevent the hands of the operator from slipping off the first and second grip sections, thus stabilizing the operability of the operation device, so that the operability remains good even after long periods of operation.

The first operation means comprises a plurality of key tops, and the second operation means comprises one key top, making the first operation means and the second operation means different in shape, so that the operator can immediately distinguish between the left and right operation means by touching the operation means with his left or right thumb, and thus operate the game machine operation device quickly and reliably.

The key tops of the first operation means are formed into the shape of a flame such that one side of each key top is semi-circular and the other side thereof is tapered. In addition, each flame-shaped key top is disposed such that the semi-circular side thereof is disposed where the finger tip of the operator is placed, and the tapered side thereof is positioned where the base of the finger is placed. Therefore, while the operator is pressing any one of the key tops of the first operation means, he can move, for example, his right thumb smoothly upward in order to move it forward or backward to a different key top. Consequently, the operator can operate the switches more easily with his thumbs, resulting in fewer operational errors when operating the first operation means and less fatigue of the thumbs.

The distance between the key tops of the first operation means is less than the width of the thumb of the operator, and the outer sides thereof are curved, allowing the operator to press any one of the key tops by rotationally moving his thumb, so that the operator can operate the first operation means by a slight rotational movement of his thumb vertically or horizontally, as a result of which the operation can be carried out quickly.

The third operation means comprises a plurality of flame-shaped key tops, each of which has one side formed into a semicircular shape and the other side tapered, and are disposed such that two of the key tops are disposed above the remaining other two key tops and two neighboring key tops are disposed symmetrically on the left and right sides of the side face of the connection section. Therefore, while the operator is pressing any one of the key tops of the third operation means, he can move his index finger or middle finger in the direction the tapered side thereof or smoothly move his index finger or middle finger upward in order to move it forward or backward, so that the operator can operate the operation device more easily with his index finger or middle finger, resulting in fewer operational errors when operating the third operation means.

In the first operation means, the distance between the key top closest to the front side face of the connecting section and the center line of the housing is smaller than the distance between the key top farthest from the front side face and the center line of the housing. In the second operation means, the distance between the key top pressing section closest to the front side face of the connecting section and the center line of the housing is smaller than the distance between the key top pressing section farthest from the front side face and the center line of the housing. Therefore, the key tops of the first and second operation means are arranged such that they are inclined in the direction in which the operator moves his left or right thumb forward and backward, so that the operator can smoothly and comfortably move his thumbs backward and forward on the key tops, thus making the first and second operation means much more easier to operate.

In the first operation means, when a line is formed by connecting the key top closest to the front side face of the connecting section and the key top farthest from the front side face, the two remaining key tops are placed on a line intersecting at right angles to this line, whereby the four keys tops are placed at the corners of a square. In the second operation means, when a line is formed by connecting the key top pressing section closest to the front side face of the connecting section and the key top pressing section farthest from the front side face, the other two pressing sections are formed on a line intersecting at right angles to this line, whereby the four pressing sections are arranged at the corners of one key top. Therefore, the operator can move both of his thumbs so as to describe an arc toward the left or right in order to smoothly and comfortably operate the switches, whereby a game machine operation device with good operability can be provided.

What is claimed is:

1. An operation device for use in a game machine, said device comprising:

a housing comprising a first grip section and a second grip section, each of said first and second grip sections having a single continuously formed curved face adapted to be gripped by each hand of an operator; and a connecting section substantially parallel to the first grip section and the second grip section for connecting the first grip section and the second grip section.

2. An operation device for use in a game machine according to claim 1, wherein the first grip section and the second grip section are conically shaped with a curve of large radius, and are disposed so as to form an inverted V shape.

3. An operation device for use in a game machine according to claim 1, wherein the connecting section and the first grip section and the second grip section form a continuous curved surface.

4. An operation device for use in a game machine according to claim 1, wherein the connecting section has recesses formed at its back side having curved surfaces that are formed continuously with the continuously formed curved faces of the first grip section and the second grip section, said recesses are adapted to receive at least the operator's middle fingers when the operator is gripping the first and second grip sections with his palms and fingers.

5. An operation device for use in a game machine according to claim 1, wherein the first grip section and the second grip section are formed long enough such that an end of the first grip section and an end of the second grip section extend beyond the palms of the operator, which allows the operator to operate said operation device with the ends of the first and second grip sections on a table.

6. An operation device for use in a game machine according to claim 1, wherein the first grip section and the second grip section are each provided with an anti-slippage member, each being formed at a location on the first grip section and at a location on the second grip section and adapted for placement of at least, the third and little fingers.

7. An operation device for use in a game machine according to claim 1, further comprising a third operation means disposed at a location within reach of the operator's left and right index fingers or the operator's left and right middle fingers on the connecting section, said third operation means comprising a plurality of flame-shaped key tops, one side of each being semicircular and the other side of each being tapered, each semicircular side being disposed to receive the tip of the index finger or the tip of the middle finger while the operator is gripping the grip section, and each tapered side being disposed to receive the base of the index finger or the base of the middle finger while the operator is gripping the grip section, the key tops forming two columns, a column containing two key tops, disposed symmetrically on the left and right sides of the front side surface of the connecting section.

8. An operation device for use in a game machine according to claim 1, wherein the first grip section and the second grip section are each provided with an anti-slippage member, each being formed at a location on the first grip section and at a location on the second section where, at least, the third and little fingers are placed.

9. An operation device for use in a game machine, said device comprising:
- a housing comprising a first grip section and a second grip section, each of said first and second grip sections having a single continuously formed curved face adapted to be gripped by each hand of an operator;
- a connecting section substantially parallel to the first grip section and the second grip section for connecting the first and second grip sections;
- a first operation means disposed on the connecting section within reach of one of an operator's thumbs while the operator is gripping the first grip section; and
- a second operation means disposed on the connecting section within reach of the operator's other thumb on the connecting section while the operator is gripping the second grip section;
- wherein the first operation means comprises a plurality of key tops, while the second operation means comprises one key top with pressing sections.

10. An operation device for use in a machine game according to claim 9, wherein the key tops of the first operation means are flame-shaped, one side of each being semi-circular and the other side of each being tapered, the semi-circular side disposed to receive the finger tip of the operator and the tapered side disposed to receive the base of the finger of the operator while the operator is gripping the first grip section.

11. An operation device for use in a game machine according to claim 10, wherein in the first operation means the distance between a key top closest to the a front side surface of the connecting section and a central line of housing is less than the distance between a key top furthest from a front side surface and the central line of the housing, and wherein in the second operation means the distance between the pressing section of the key top closest to the front side surface of the connecting section and the center line of the housing is less than the distance between the pressing section of the key top furthest from the front side surface and the central line of the housing.

12. An operation device for use in a game machine according to claim 9, wherein the separation distance between the key tops of the first operation means is smaller than the width of the thumb of the operator, and the outer side surfaces of the key tops are curved, allowing the operator to press any one of the key tops by a rotational movement of the thumb.

13. An operation device for use in a game machine according to claim 9, wherein in the first operation means the distance between a key top closest to the front side surface of the connecting section and a central line of the housing is less than the distance between a key top furthest from the front side surface and the central line of the housing, and wherein in the second operation means the distance between the pressing section of a key top closest to the front side surface of the connecting section and the center line of the housing is less than the distance between the pressing section of a key top furthest from the front side surface and the central line of the housing.

14. An operation device for use in a game machine according to claim 13, wherein in the first operation means when the key top closest to the front side surface of the connecting section is connected to the key top furthest from the front side surface with a first line, the other two key tops are formed on a second line perpendicular to the first line, whereby the four key tops are disposed at the corners of a square, and wherein in the second operation means when the key top pressing section closest to the front side surface of the connecting section is connected to the key top pressing section furthest from the front side surface with a third line, the other two key top pressing sections are formed on a fourth line perpendicular to the third line, whereby the four key top pressing sections are disposed at the corners of a square.

\* \* \* \* \*